United States Patent
Huang et al.

(10) Patent No.: US 9,392,607 B2
(45) Date of Patent: Jul. 12, 2016

(54) TWO-DIMENSIONAL UE PAIRING IN MIMO SYSTEMS

(75) Inventors: Weilan Huang, Beijing (CN); Yang Hu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 178 days.

(21) Appl. No.: 13/884,998

(22) PCT Filed: Nov. 15, 2010

(86) PCT No.: PCT/CN2010/001822
§ 371 (c)(1),
(2), (4) Date: May 13, 2013

(87) PCT Pub. No.: WO2012/065278
PCT Pub. Date: May 24, 2012

(65) Prior Publication Data
US 2013/0229941 A1    Sep. 5, 2013

(51) Int. Cl.
| | | |
|---|---|---|
| H04W 72/08 | (2009.01) | |
| H04B 7/04 | (2006.01) | |
| H04B 7/06 | (2006.01) | |
| H04L 5/00 | (2006.01) | |
| H04L 25/02 | (2006.01) | |
| H04B 7/02 | (2006.01) | |

(52) U.S. Cl.
CPC .............. *H04W 72/08* (2013.01); *H04B 7/0452* (2013.01); *H04B 7/0626* (2013.01); *H04B 7/0634* (2013.01); *H04B 7/0639* (2013.01); *H04L 5/006* (2013.01); *H04L 5/0023* (2013.01); *H04L 25/021* (2013.01); *H04B 7/024* (2013.01)

(58) Field of Classification Search
None
See application file for complete search history.

(56) References Cited

U.S. PATENT DOCUMENTS

| 2008/0063116 | A1* | 3/2008 | Yokoyama | 375/299 |
|---|---|---|---|---|
| 2008/0311939 | A1* | 12/2008 | Hugl et al. | 455/507 |
| 2009/0086706 | A1* | 4/2009 | Huang et al. | 370/349 |
| 2009/0196240 | A1* | 8/2009 | Frederiksen et al. | 370/329 |

(Continued)

FOREIGN PATENT DOCUMENTS

| CN | 101741523 A | 6/2010 |
|---|---|---|
| KR | 20100078090 A | 7/2010 |

OTHER PUBLICATIONS

Huawei, "Evaluation of PMI Feedback Schemes for MU-MIMO Paring", 3GPP TSG RAN WG1 meeting #58, Shenzhen, China, Aug. 24, 2009, pp. 1-3, R1-093061, 3rd Generation Partnership Project.

(Continued)

*Primary Examiner* — Huy D Vu
*Assistant Examiner* — Hong Shao
(74) *Attorney, Agent, or Firm* — Coats & Bennett, PLLC

(57) ABSTRACT

A method and a radio base station are provided for selecting a first User Equipment (UE) and at least a second UE from a plurality of UEs, for sharing a transmission resource in the time-frequency dimension in a multiple input multiple output (MIMO) transmission. A first and second imperfection of Channel State Information (CSI) made available for the first UE and second UE, respectively is estimated (410, 420). Spatial correlation between the first UE and the at least second UE is estimated (450), and the first and at least second UE are selected (470) to share a transmission resource in the time-frequency dimension, if both of the first and second imperfections are determined above (430, 440) a first threshold and the spatial correlation is determined below (460) a second threshold.

24 Claims, 4 Drawing Sheets

(56) References Cited

U.S. PATENT DOCUMENTS

| | | | |
|---|---|---|---|
| 2011/0122961 A1* | 5/2011 | Sang et al. | 375/267 |
| 2011/0164510 A1* | 7/2011 | Zheng et al. | 370/252 |
| 2011/0194504 A1* | 8/2011 | Gorokhov et al. | 370/329 |
| 2011/0269490 A1* | 11/2011 | Earnshaw et al. | 455/509 |
| 2013/0003583 A1* | 1/2013 | Landstrom et al. | 370/252 |

OTHER PUBLICATIONS

Alcatel-Lucent, "UE PMI feedback signalling for user pairing/coordination", 3GPP TSG RAN WG1 #56 Meeting, Athens, Greece, Feb. 9, 2009, pp. 1-4, 3rd Generation Partnership Project.

International Search Report for Application No. PCT/CN2010/001822 issued on Aug. 25, 2011.

3RD Generation Partnership Project, "Further Advancements for E-UTRA Physical Layer Aspects", Technical Specification Group Radio Access Network, Nov. 2009, 3GPP TR 36.814 V1.5.0, (Release 9).

3RD Generation Partnership Project, "Evolved Universal Terrestrial Radio Access (E-UTRA); Physical Channels and Modulation", Technical Specification Group Radio Access Network, Dec. 2009, 3GPP TS 36.211 V9.0.0, (Release 9).

* cited by examiner

TWO-DIMENSIONAL UE PAIRING IN MIMO SYSTEMS

TECHNICAL FIELD

The present disclosure relates to the field of radio telecommunications. More specifically, it relates to a method and radio base station for UE pairing in a MIMO transmission.

BACKGROUND

The 3rd Generation Partnership Project (3GPP) is responsible for the standardization of UMTS (Universal Mobile Telecommunication Service) system and LTE (Long Term Evolution). LTE is a technology for realizing high-speed packet-based communication that can reach high data rates both in the downlink (DL) and in the uplink (UL), which is thought as a next generation mobile communication system of the UMTS system. The 3GPP work on LTE is also referred to as E-UTRAN (Evolved Universal Terrestrial Access Network). The first release of LTE, referred to as release-8 (Rel-8) can provide peak rates of 300 Mbps, a radio-network delay of e.g. 5 ms or less, a significant increase in spectrum efficiency and a network architecture designed to simplify network operation, reduce cost, etc. In order to support high data rates, LTE allows for a system bandwidth of up to 20 MHz. LTE is also able to operate in different frequency bands and can operate in at least FDD (Frequency Division Duplex) and TDD (Time Division Duplex). The modulation technique or the transmission scheme used in LTE is known as OFDM (Orthogonal Frequency Division Multiplexing).

The next generation mobile communications system e.g. IMT-Advanced (International Mobile Telecommunications) and/or LTE-Advanced (LTE-A), which is an evolution of LTE, and supports bandwidths of up to 100 MHz is being discussed. LTE-A can be viewed as a future release of the LTE standard and since it is an evolution of LTE, backward compatibility is important because LTE-A could be deployed in spectrum that is already occupied by LTE. In both LTE and LTE-A radio base stations known as eNBs or eNodeBs— where e stands for evolved-, multiple antennas with precoding/beamforming technology can be adopted in order to provide high data rates to user equipments. Thus, LTE and LTE-A are examples of MIMO (Multiple-Input, Multiple-Output) radio systems. Another example of a MIMO based system is WiMAX (Worldwide Interoperability for Microwave Access) system.

In a cellular telecommunication system which typically comprises, as illustrated in FIG. 1, a core network 1, a radio access network 2, User Equipment (UEs) 4 and 5 and at least one radio base station 3, multiple transmit antennas can be used for achieving high data rates in various ways. A multiple-input-multiple-output (MIMO) channel is formed if also the receiver has multiple antennas. One application in such a setup is to strive for high peak rates to a single user. By transmitting on several layers which means that the information is transmitted on several bit streams the information is spread in the spatial domain, substantial improvement in data rate can be achieved under favourable channel conditions.

The number of simultaneously transmitted layers depends on the properties of the MIMO channel. Because of for example fading, usually the MIMO channel does not support more than one layer transmission to a single UE. This limits the data rate and means that spatial multiplexing gain is not possible. To reach higher system capacity it would be beneficial to transmit only a limited number of layers to a single user and instead schedule several users on the same physical resource (e.g. time-frequency-code tile) and use the spatial domain (layers) to separate the users. In essence, then layers belonging to different users are transmitted on the same physical resource. Even if the channel to a particular user is such that it does not support multiple layers, which means that it is not possible to transmit multiple layers to that particular user, spatial multiplexing gain on a system level can be achieved as long as the user can efficiently suppress the layers transmitted to the other users. This technique is often referred to as multi-user MIMO (MU-MIMO) and is especially attractive in high load scenarios with many active users.

FIG. 2 shows an example of a base station 30, with multiple transmit antennas 33, transmitting in MU-MIMO mode to multiple UEs 40, 50 and 60. As shown in FIG. 2 different layer 44, 55 and 66 is transmitted to each UE 40, 50 and 60. As also illustrated in FIG. 2 each UE is also transmitting to the base station 30 using different layers.

Multi-user MIMO (MU-MIMO) is a set of advanced MIMO technologies that exploit the availability of multiple independent radio terminals in order to enhance the communication capabilities of each individual terminal. MU-MIMO can be seen as the extended concept of Space-Division Multiple Access (SDMA), which allows eNodeB to transmit (or receive) signal to (or from) multiple users in the same frequency band simultaneously.

In LTE, the MU-MIMO scheme is supported. More specifically,

In LTE Rel-8, MU-MIMO is supported in both uplink and downlink as specified in 3GPP technical specification TS 36.211 version 9.0.0. In the uplink, the eNodeB can always schedule more than one UE to transmit in the same time-frequency resource. In the downlink, if a UE is configured to be in the MU-MIMO transmission mode, only rank-1 transmission can be scheduled to the UE. The eNodeB can schedule multiple UEs in the same time-frequency resource using different rank-1 precoding matrices.

In LTE Ret-9, a more advanced MU-MIMO scheme is specified, where up to two UEs can be scheduled in two different orthogonal demodulation reference signals (DM-RS) [1]. At least, channel estimation for each UE has less impact by UE pairing algorithm.

In LTE-A, i.e. Rel-10, MU-MIMO is being further discussed in 3GPP technical specification TS 36.814 version 1.5.0, nevertheless Rel-9 MU-MIMO functionality is taken as a baseline.

Theoretically, the performance of wireless communication systems can be improved by having multiple antennas at the transmitter side and the receiver side. In practice, the channels between different antennas are often correlated and therefore the potential multi-antenna gains may not always be obtainable. This is called spatial correlation as it can be interpreted as a correlation between a signal's spatial direction and the average received signal gain.

High spatial correlation is when channel fading coefficients are statistically close or correlated.

Low spatial correlation is when channel fading coefficients are statistically independent or un-correlated.

The MIMO performance, and particularly the MU-MIMO performance, then relies on good UE pairing and/or co-scheduling at the radio base station or eNodeB side. Essentially, only the UEs with good spatial separation or low spatial correlation may or should be co-scheduled in the same time-frequency resource.

So, in order to guarantee MIMO performance, and particularly MU-MIMO performance, it is important for an eNodeB base station to obtain channel state information (CSI), including one or more of Channel Quality Indication, (CQI), Precoder Matrix Indication (PMI), ACK/NACK information and Rank Indication (RI), from each UE to judge whether or not they can be co-scheduled. For instance, in FDD, PMI-like feedback can be used while in TDD, DL/UL channel reciprocity can be exploited. Good MU-MIMO pairing performance for example relies on interference suppression between co-scheduled UEs. Spatial correlation is measured and or calculated to judge interference leakage between UEs. The larger the spatial correlation, the more serious the interference leakage is.

More specifically, a radio base station may obtain CSI information (i.e. channel fading coefficients) from each UE via e.g. PMI feedback from codebooks when in FDD/TDD mode or by performing channel estimation on uplink sounding reference signals, SRS, to exploit DL/UL reciprocity when in TDD mode.

Conventional UE pairing algorithms are usually based on the measurement of spatial correlation by using obtained CSI from each UE. However, such a measurement is not enough to guarantee low interference between paired UEs, due to mismatch factors on CSI accuracy. More specifically, such factors include but are not limited to feedback delay, channel estimation or prediction errors, and quantized feedback. Factors that influence the accuracy of channel state information, CSI, are among other things dependent on that:

Interference information cannot be truly reflected at the radio base station or eNB side. Typically in LTE Rel-8, The UE generates the PMI/CQI feedback without any knowledge about other simultaneously scheduled UEs. Hence, there could be mismatch between the UE's CQI report and the actual CQI experienced due to lack of knowledge of interference caused by another UE scheduled simultaneously. Even in TDD case, DL/UL interference is not reciprocal, which determines CSI accuracy will be influenced. Other factors also include estimation errors, prediction errors and quantization errors.

Mobility impact can not be really captured by eNB. There always exists scheduling duration between CSI feedback/measurements and actual downlink or uplink scheduling. Over time, channels could vary with time. The higher the UE mobility is, the faster the channel varies. The mismatch of CSI accuracy between feedback and scheduling could impact the scheduling strategy relying on spatial correlation.

The UEs co-scheduled in downlink or uplink could have different feedback time, which further introduce CSI mismatch between UEs. FIG. 3 shows one such example of CSI mismatch between two UEs due to different feedback times for both TDD and FDD, where PMI feedback is used for FDD and channel reciprocity feedback is used for TDD.

SUMMARY

An object of embodiments herein is to provide a method and radio base station to improve performance of a radio communications network whilst obviating at least one of the above mentioned problems.

According to a first aspect of embodiments herein the object is achieved by a method in a radio base station for selecting a first User Equipment, UE, and at least a second User Equipment from a plurality of UEs, for using the same or sharing a transmission resource in the time-frequency dimension in a Multiple Input Multiple Output, MIMO, transmission. The method comprises estimating a first imperfection of Channel State Information, CSI, made available for the first UE. It further comprises estimating a second imperfection of Channel State Information, CSI, made available for the at least second UE. The method also involves estimating a spatial correlation between the first UE and the at least second UE, and selecting the first and at least second UE to share a transmission resource in the time-frequency dimension, if both of the first and second imperfections are above a first threshold and the spatial correlation is below a second threshold.

According to a second aspect of embodiments herein the object is also achieved by a Radio Base Station, RBS configured for Multiple Input Multiple Output, MIMO transmission comprising transceiver and antenna elements having at least two antenna ports on the transmitting side. The RBS also comprises processing circuitry configured for selecting a first User Equipment, UE, and at least a second User Equipment from a plurality of UEs, for using the same or sharing a transmission resource in the time-frequency dimension in a Multiple Input Multiple Output, MIMO, transmission. The processing circuitry is further configured for estimating a first imperfection of Channel State Information, CSI, made available for the first UE and also configured for estimating a second imperfection of Channel State Information, CSI, made available for the at least second UE. The processing circuitry is furthermore configured for estimating a spatial correlation between the first UE and the at least second UE, and configured for selecting the first and at least second UE to share a transmission resource in the time-frequency dimension, if both of the first and second imperfection are above a first threshold and the spatial correlation is below a second threshold.

This provides the advantage of improved MIMO performance, especially for MU-MIMO, by reducing interference between co-scheduled UEs. Thus, the performance of the radio communications network is improved in an efficient manner.

Further characteristics of this disclosure and advantages thereof will be evident from the following detailed description of example embodiments.

BRIEF DESCRIPTION OF THE DRAWINGS

The present disclosure will become more fully understood from the detailed description of aspects and embodiments given here below and the accompanying FIGS. 1 to 6, which are given by way of illustration only, and thus are not limitative of the present disclosure.

DETAILED DESCRIPTION

In the following description, for purposes of explanation and not limitation, specific details are set forth, such as particular techniques and applications in order to provide a thorough understanding of the present disclosure. However, it will be apparent to one skilled in the art that the aspects and embodiments of the present disclosure may be practiced in other embodiments that depart from these specific details. In other instances, detailed descriptions of well-known methods and apparatuses are omitted so as not to obscure the following description with unnecessary details.

This disclosure relates generally to performance improvement of multiple-input multiple-output (MIMO) transmission and specifically to MU-MIMO transmission. It is related to pairing and co-scheduling of mobile User Equipment (UEs) also known as mobile terminals and/or wireless terminals, for example through utilizing an improved pairing method and algorithm at the radio base station (RBS) or eNodeB side. The disclosed aspects and embodiments of the present solution are discussed based on the Evolved Universal Terrestrial Radio Access (E-UTRA) system (which is also commonly referred to as the Long-Term Evolution (LTE) of the widely deployed WCDMA systems but are applicable to any MIMO capable wireless communications system.

Figure 1:
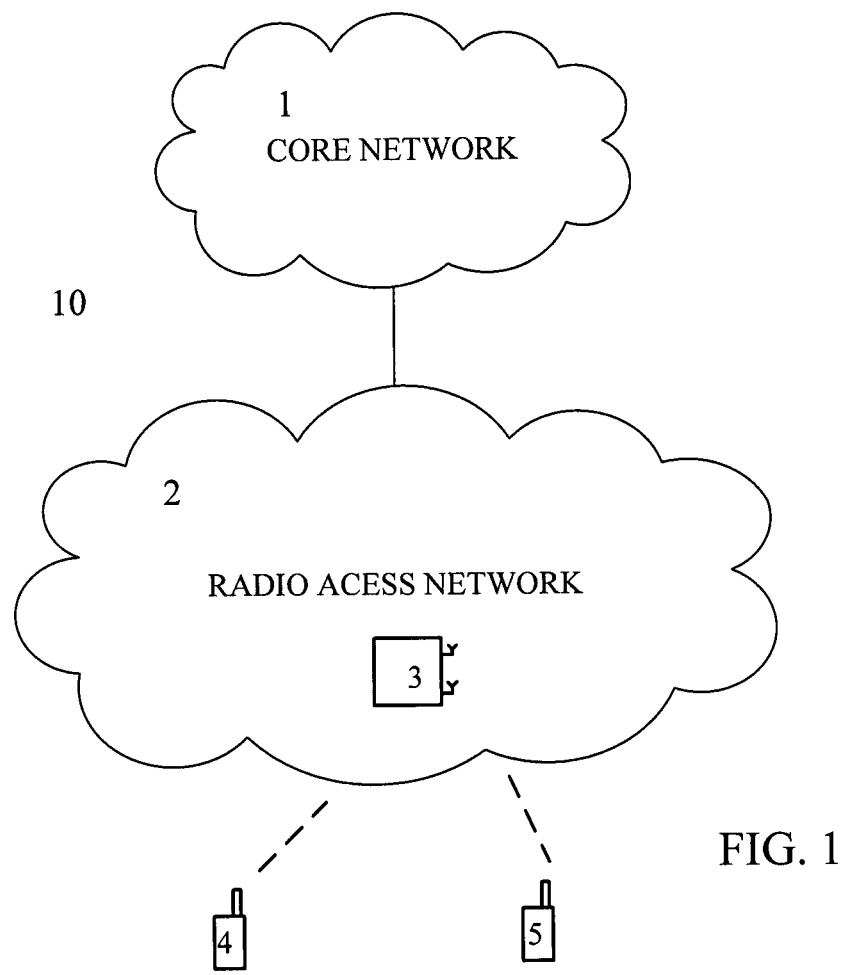
FIG. 1 illustrates a MIMO capable cellular telecommunication system.
Figure 2:
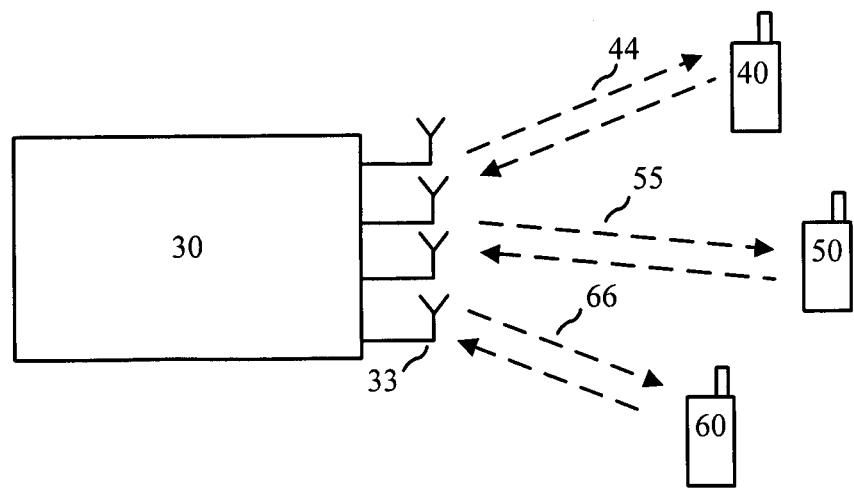
FIG. 2 illustrates a base station operating in MU-MIMO mode.

Embodiments of a UE pairing or co-scheduling method in a radio base station, e.g. for implementation in a MIMO capable LTE or LTE-A system network such as schematically illustrated in FIG. 1, or any other MIMO capable wireless communications system, will now be described as well as embodiments of a radio base station configured for carrying out such a method.

Figure 4:
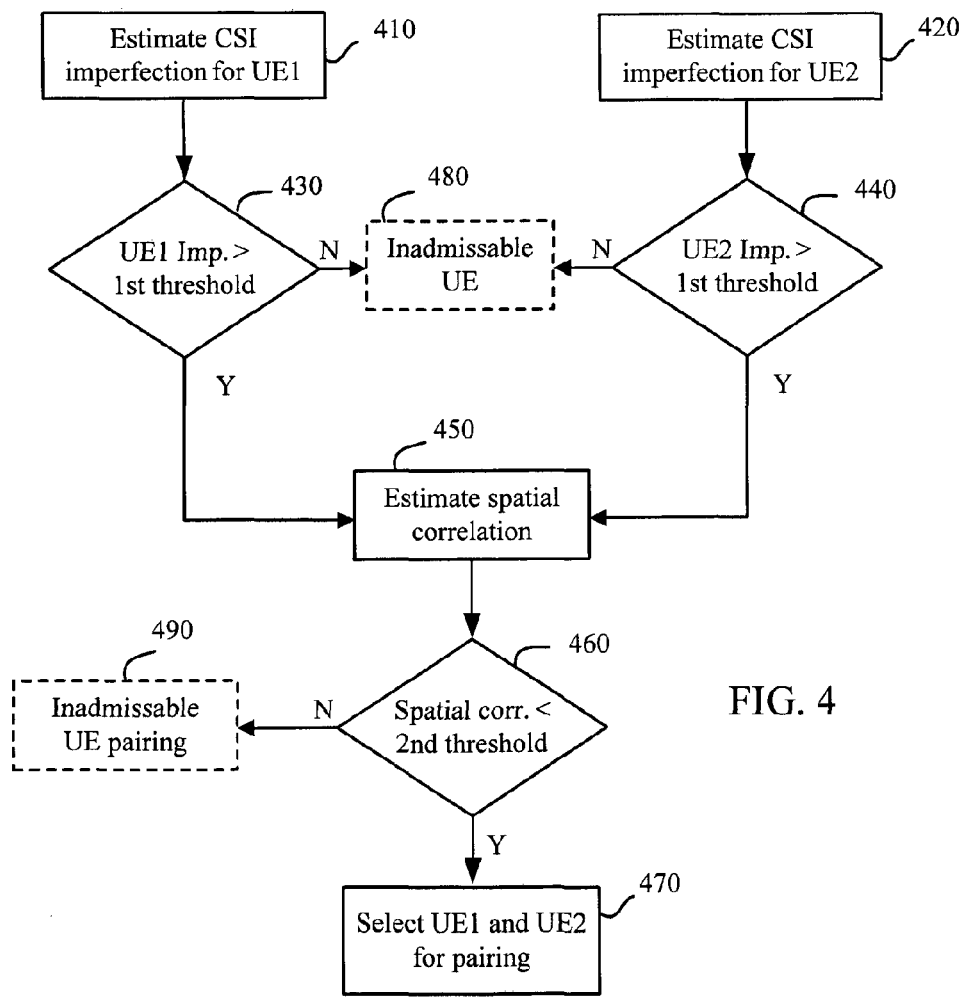
FIGS. 4 and 5 are schematic flowcharts illustrating embodiments of a method in a radio base station.

FIG. 4 is a flowchart illustrating one embodiment of a method in a radio base station, RBS for selecting a first UE, and at least a second UE from a plurality of UEs, for using the same or sharing a transmission resource in the time-frequency dimension in a multiple input multiple output, MIMO, transmission. The RBS to this end comprises transceiver and antenna elements and is configured for multiple input multiple output, MIMO, transmission.

The RBS may be configured for handling one or more MIMO signalling techniques such as one or more of single user MIMO (SU-MIMO), multi user MIMO (MU-MIMO) and coordinated MIMO (CO-MIMO). The RBS may also be configured for switching between two or more of single user MIMO (SU-MIMO), multi user MIMO (MU-MIMO) and coordinated MIMO (CO-MIMO) signalling mode. The respective first and at least second UE may be a mobile station, a mobile telephone also known as a "cellular" telephone, and a laptop with wireless capability, e.g., mobile termination, and thus may be a, for example, portable, pocket, hand-held, computer-included, or car-mounted mobile device which communicates voice and/or data with a radio access network such as the MIMO capable radio access network of FIG. 1.

The FIG. 4 method, illustrating the pairing of a first UE and at least a second UE, comprises estimating 410 a first imperfection of Channel State Information, CSI, made available for the first UE. The first imperfection of the channel state information for the first UE may be estimated using a correlation, $R1'$, between a first transmission channel estimation made available for the first UE and a second transmission channel estimation made available for the first UE. The first transmission channel estimation may be a so-called "true channel" estimation, by which is herein meant an estimation of a channel to be actually measured. The second transmission channel estimation may in turn be a so-called "estimated channel", which channel estimate is predicted based on one or more previous channel measurement(s). Accordingly, the estimated first transmission channel for the first UE may be denoted first true transmission channel and said second estimated transmission channel for the first UE may be denoted first estimated transmission channel.

The method further comprises estimating 420 a second imperfection of Channel State Information, CSI, made available for the second UE. The second imperfection of the channel state information for the at least second UE may be estimated using a correlation, $R1''$, between a third transmission channel estimation for the second UE and a fourth transmission channel estimation for the second UE. The third transmission channel estimation may be so-called "true channel" estimation, here meaning an estimation of a channel to be actually measured. The fourth transmission channel estimation may be a so-called "estimated channel", which channel estimate is predicted based on one or more previous channel measurement(s). Accordingly, the estimated third transmission channel for the at least second UE may be denoted second true transmission channel and the estimated fourth transmission channel for the at least second UE may be denoted second estimated transmission channel.

Alternatively, the imperfections of the channel state information are estimated using a ratio of NACK messages to ACK messages received from said first UE and at least second UE during a respective scheduling delay for each of said first UE and at least second UE.

The acknowledgement function with ACK and NACK messages is well known in the art and used in the automatic repeat-request ARQ functions as well as in the hybrid automatic repeat request HARQ functions as an error-control method for data transmission that uses acknowledgements (messages sent by the receiver indicating that it has correctly received a data frame or packet) and timeouts (specified periods of time allowed to elapse before an acknowledgment is to be received) to achieve reliable data transmission over an unreliable service. If the sender does not receive an acknowledgment before the timeout, it usually re-transmits the frame/packet until the sender receives an acknowledgment or exceeds a predefined number of re-transmissions.

The Channel State Information, CSI, may be made available as measurements, calculations or a combination of measurements and calculations performed in the radio base station for the first UE and second UE, respectively. Alternatively, the Channel State Information, CSI, is made available as measurements and/or calculations received in a transmission from the first UE and second UE, respectively.

The "true channels" may for example be estimated via PMI feedback or uplink sounding reference signal SRS for TDD while the "estimated channels" are, as already described, actually predicted channels based on one or more previous channel measurement(s) and/or some function with inputs of parameters, such as parameters related to Doppler effect, ACK/NACK, etc.

The Channel State Information, CSI, may comprise one or more of Channel Quality Indication information, CQI, Precoder Matrix Information, PMI, estimated channel information and ACK/NACK information.

The method also involves estimating 450 a spatial correlation between the first UE and the at least second UE. The estimating of a spatial correlation between the first UE and the at least second UE may comprise to estimate a correlation, R2, between a channel matrix H1 for the transmission channel for the first UE and the channel matrix H2 for the transmission channel for the second UE.

The correlation R2 may then be estimated by calculating $R2=|u_1^H u_2|$ where $u_i$ is the first column of the matrix $U_i$ from the singular value decomposition of the matrix $H_i$, and where $H_i=U_i \Lambda_i V_i^H$ and i=1, 2.

Alternatively, the estimating of a spatial correlation between said first UE and said at least second UE may comprise receiving a first PMI feedback, W1, from the first UE and a second PMI feedback, W2, from the second UE. The spatial correlation, R2 is then estimated by $$R_2 = \frac{\operatorname{trace}\{|W_1^H * W_2|\}}{N},$$

where H denotes a conjugate transpose operation and N denotes a number of supported layers.

The method of FIG. 4 furthermore involves selecting 470 the first and at least second UE to share a transmission resource in the time-frequency dimension, if both of the first and second imperfections are determined to be above a first threshold 430, 440 and the spatial correlation is determined to be below a second threshold 460. The first and at least second UE may in some embodiments be selected to use or share the same transmission resource in the time-frequency dimension, if both R1' and R1" are above a first threshold and the spatial correlation is below a second threshold.

According to some embodiments, the first and at least second UE are scheduled to share the transmission resource in the time and frequency dimension. The first and at least second UE may also be assigned different antenna ports of the one or more antenna elements.

During a scheduling delay, i.e. the time from CSI feedback (e.g. PMI feedback in FDD/TDD or channel reciprocity in TDD) to actual scheduling, other feedback may be obtained at the radio base station to provide more information on channel imperfection. For instance, in case there is a total of 6 ACK/NACK reports sent from the UEs, such as UE1 and UE2, and when there out of these are 6 ACK and no NACK reported, channel fading is judged or estimated as stable during a scheduling delay, i.e. there is strong channel correlation, something which further shows that CSI feedback could be obtained directly at the time of actual scheduling. On the other hand, when the first three ACK/NACK reports are ACK and the following three ACK/NACK reports are NACK, channel fading is estimated as changing fast since the change of data quality can show the extent of channel correlation.

According to some embodiments, a first Doppler frequency and a first scheduling delay is determined for the first UE, and a second Doppler frequency and a second scheduling delay is determined for the at least second UE.
The correlations R1' and R1" may then be estimated using a zero order Bessel function of the first kind according to:

$R_1 = J_0(2\pi f_d t_\Delta)$, where $f_d$ is the Doppler frequency, and $t_\Delta$ is the scheduling delay.

The respective threshold correlation values R1 and R2 may be experimental values set in the radio base station. The correlation threshold values may thus be set by default in the radio base station or configured dynamically through higher layer signaling, such as radio resource control (RRC) signaling. The correlation threshold values may accordingly be set different or adapted in terms of actual implementation details, such as the thresholds being adapted to specific transmission mode for data, MIMO configuration, system sensitivity with SINR, etc. An example CSI imperfection threshold value for R1 may then be set to 0.8, which in the above equation corresponds to normalized Doppler frequency fdtΔ=0.15. An example threshold value for spatial correlation R2 may be set to 0.4 or 0.3.

For instance, a normalized correlation value of 0.1 or 0.2 would indicate that the correlation between two channels is weak. This should be correctly understood as something different from correlation "threshold" value.

The scheduling delay may in turn be determined by the radio base station or eNB according to actual scheduling with last CSI feedback.

The Doppler frequency is determined through estimation by the radio base station according to well known procedures for those skilled in the art, e.g. using known algorithms for estimating a correlation between two uplink demodulation reference signals DM-RS.

In some embodiments a ratio of received NACK messages to received ACK messages from each of the first UE and at least second UE is established and used to estimate the channel state information imperfection, CSI, between the estimated transmission channel and the true transmission channel during the respective scheduling delay of each UE. The ratio may be determined by a window size of the scheduling delay and a number of actual data transmissions.

It will now be specifically explained in accordance with embodiments of the present disclosure whether two UEs can be allocated to share the same time-frequency resource or not, based on a low-complexity two-dimensional correlation indicator $\rho=(\rho_1, \rho_2)$. The explanation for $\rho$ and the procedure of UE pairing based on the calculation of $\rho$ are described in the following and in conjunction with a method for UE pairing as described and illustrated below in FIG. 5.

Without loss of generality, two UEs are taken into consideration, which are denoted as UE1 and UE2. Assume that the channel matrices of these two UEs on a specific time-frequency resource are $H_1$ and $H_2$, respectively. $\rho_1$ denotes the correlation between the channel matrices, which substantially determines the mutual interference of the two UEs. This means that, the higher $\rho_1$ is, the higher is the mutual interference as a result of lower UE separability, and vice versa. A good UE pairing algorithm should prevent UEs of low separability from being scheduled into the same time-frequency resource because the resultant high interference would greatly reduce the system performance. Note that there could be multiple definitions for the calculation of $\rho_1$, which may vary depending on the application scenarios and pre-coding/decoding schemes. One sample example of $\rho_1$ calculation is defined as $$\rho_1 = |u_1^H u_2| \quad (1)$$

where weight vectors $u_1$ and $u_2$ denote the first column vectors of $U_1$ and $U_2$, respectively. $U_1$ and $U_2$ represent unitary matrices obtained by decomposing $H_1$ and $H_2$ using SVD (singular value decomposition), i.e., $$H_1 = U_1 \Lambda_1 V_1^H, H_2 = U_2 \Lambda_2 V_2^H \quad (2)$$

Figure 3:
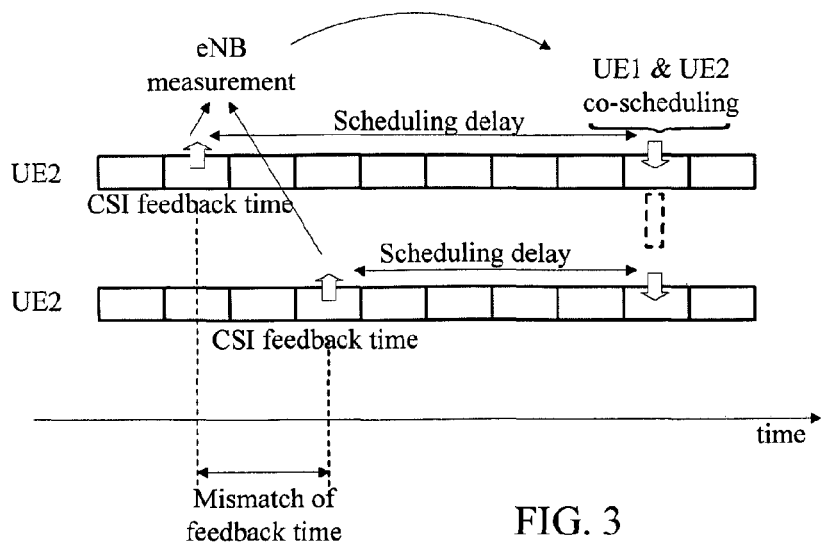
FIG. 3 is a schematic illustration of CSI mismatch due to scheduling delay during a UE co-scheduling procedure.

On the other hand, $\rho_2$ denotes imperfection of the CSI. As was partly mentioned above, possible factors to result in such imperfection may include feedback delay, channel estimation or prediction errors, and quantized feedback, to name some factors. For example, as illustrated in FIG. 3, the scheduling delay determines the difference in time between the feedback of so-called "estimated" channels and "true" channels. In such case, $\rho_2$ corresponds to the correlation between the true channel and estimated channel in the time domain. Here, the "true" channel is estimated via PMI feedback or uplink sounding reference signal SRS for TDD while the "estimated" channel is actually a predicted channel based on some function with inputs of parameters, such as parameters related to Doppler effect, ACK/NACK, etc. Specifically, when the Doppler effect is considered, $\rho_2$ depends on the Doppler frequency $f_d$ normalized by the scheduling delay $t_\Delta$. $f_d$ would vary as the mobility speed of UE changes, and $\rho_2$ can be calculated as $$\rho_2 = J_0(2\pi f_d t_\Delta) \quad (3)$$

where $J_0(\bullet)$ is the zeroth order Bessel function of the first kind.

The reason to use the two-dimensional indicator to judge the UE pairing is that, the use of one-dimensional correlation such as $\rho_1$ is not enough to guarantee the low interference given outdated channel information (when $\rho_2$ is small). Note that $\rho_2$ is UE-specific because different UEs may correspond to different scheduling delays. A proposed procedure to apply a two-dimensional correlation indicator is illustrated in FIG. 5 and described in the following.

Figure 5:
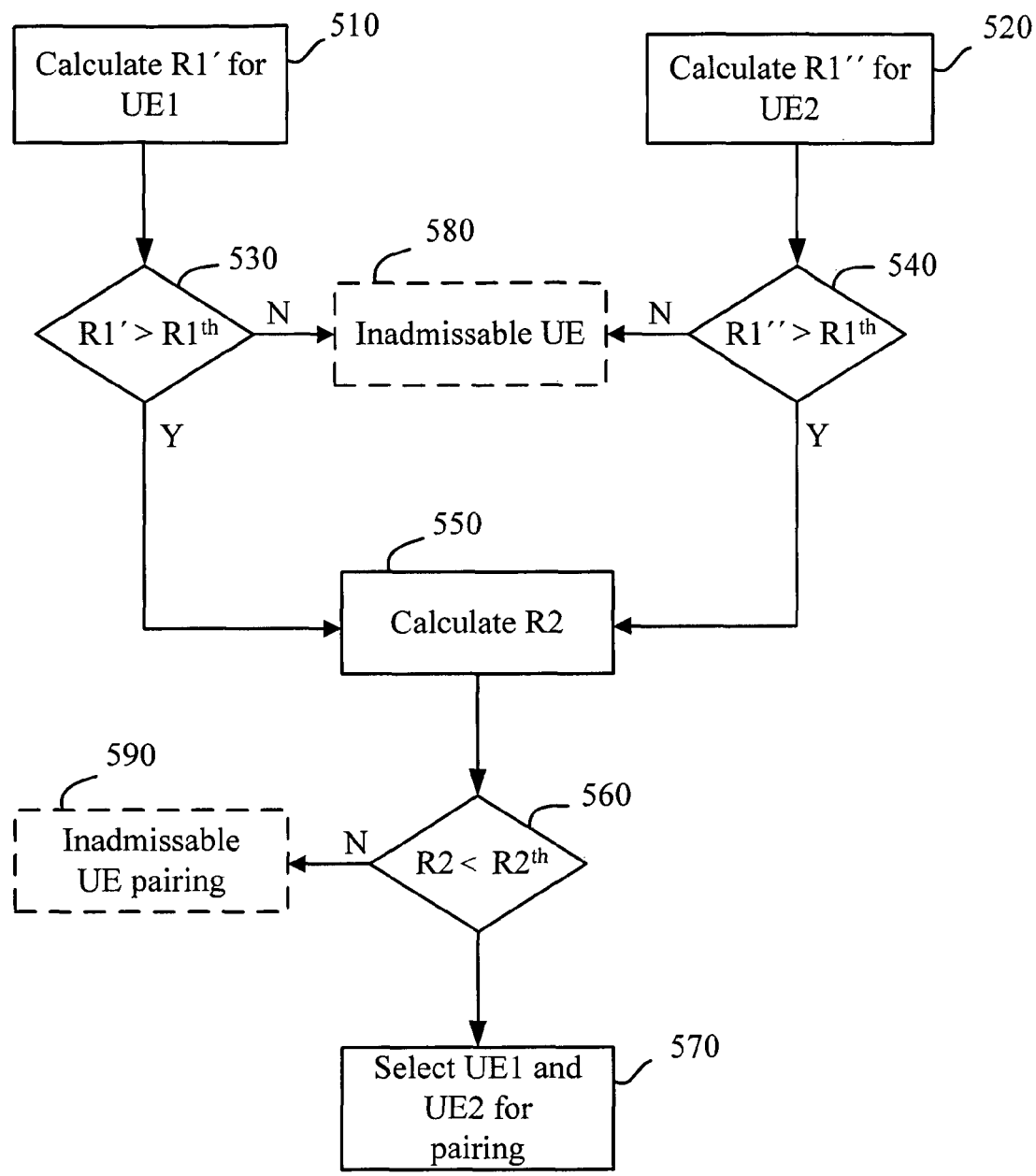

FIG. 5 in a flowchart schematically illustrates an embodiment of a UE pairing method in a radio base station, RBS, configured for multiple input multiple output, MIMO, transmission. The RBS comprises transceiver and antenna elements and may also comprise a scheduler for scheduling a first UE and at least a second UE to share or use the same transmission resource in a MIMO transmission after having been selected for pairing, for example selected for being paired and/or co-scheduled in accordance with any of the herein disclosed pairing and/or co-scheduling procedures.

The pairing method comprises to determine, for example by calculating 510, 520, channel state information imperfection R1' or $\rho_{2,1}$ and R1" or $\rho_{2,2}$ for the respective first and at least second UE, e.g. UE1 and UE2, and to examine or compare 530, 540 whether the calculated CSI imperfection R1' or $\rho_{2,1}$ for UE1 and R1" or $\rho_{2,2}$ for UE2 respectively is larger or not than a first threshold $R1^{th}$ or $\rho_2^{th}$. If, upon said examination or comparison, the CSI imperfection values of both of the first and at least second UE are larger than the first threshold, then a spatial correlation R2 or $\rho_1$ is calculated 550 for the first and at least second UE. Else, if at least one of the UEs has a CSI imperfection value being smaller than the first threshold $R1^{th}$ or $\rho_2^{th}$ this UE will be excluded 580 from the admissible set for pairing with any other UE to be scheduled or co-scheduled in a MIMO transmission on the same resource. The spatial correlation calculated for the two admissible UEs for pairing, e.g. UE1 and UE2, is then examined or compared 560 to determine whether or not the spatial correlation R2 or $\rho_1$ is smaller than a second threshold $R2^{th}$ or $\rho_1^{th}$. If the spatial correlation value R2 or $\rho_1$ is found to be smaller than the second threshold $R2^{th}$ or $\rho_1^{th}$ the two UEs, e.g. UE1 and UE2, are selected 570 for pairing to be co-scheduled in a MIMO transmission on the same resource, i.e. they are allocated to share transmission resource. If the spatial correlation R2 or $\rho_1$ of the first and at least second UE, e.g. UE1 and UE2, on the other hand is found not smaller than the second threshold $R2^{th}$ or $\rho_1^{th}$, that is when R2 or $\rho_1$ of the two admissible UEs is equal to or above the second threshold $R2^{th}$ or $\rho_1^{th}$, then they are determined 590 as inadmissible for such UE pairing so that they will not be co-scheduled in a MIMO transmission on the same resource.

Figure 6:
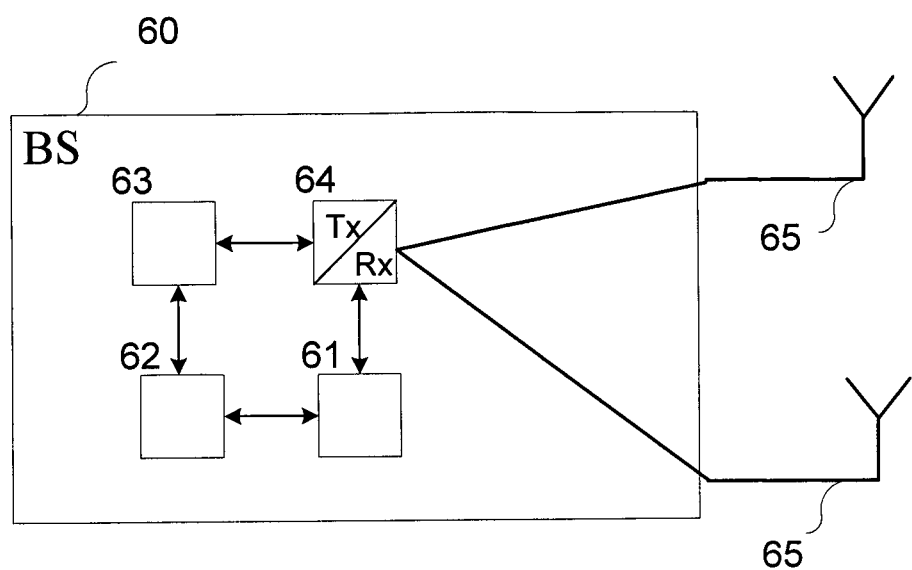
FIG. 6 schematically illustrates embodiments of a radio base station.

FIG. 6 discloses a Radio Base Station, RBS, 60 adapted for pairing of a first UE and at least a second UE to share or use the same transmission resource in a MIMO transmission in accordance with the herein described embodiments. The RBS 60 is to this end configured for Multiple Input Multiple Output, MIMO transmission comprising a transceiver 64 with signal transmitting and signal receiving circuitry (not shown) and one or more antenna elements 65 each comprising a physical antenna and having antenna ports (not shown). The RBS furthermore has processing circuitry 61 configured for selecting a first User Equipment, UE, and at least a second User Equipment from a plurality of UEs, for sharing a transmission resource in the time-frequency dimension in a Multiple Input Multiple Output, MIMO, transmission. The processing circuitry is further configured for estimating a first imperfection of Channel State Information, CSI, made available for the first UE and also configured for estimating a second imperfection of Channel State Information, CSI, made available for the second UE. The processing circuitry is furthermore configured for estimating a spatial correlation between the first UE and the at least second UE, and configured for selecting the first and at least second UE to share a transmission resource in the time-frequency dimension, if both of the first and second imperfection are above a first threshold and the spatial correlation is below a second threshold.

According to embodiments of the Radio Base Station, RBS, the processor 61 makes use of software instructions stored in a memory 62 in order to control functions of the node, including the functions and method steps of the embodiments described in detail herein with regard to the CSI imperfection and spatial correlation estimations and/or calculation and the UE pairing and selecting procedure. Further details regarding how the described units operate in order to perform normal functions within a MIMO capable network, such as an LTE or LTE-A network, are known to the skilled person and are therefore not discussed further.

The Radio Base Station, RBS, may also comprise a scheduler 63 for scheduling the first and at least second UE to share the transmission resource in the time and frequency dimension upon said selection of UEs being made. The processing circuitry may furthermore be configured for assigning different antenna ports of the antenna element or antenna ports of different antenna elements, to the first and at least second UE respectively for the MIMO transmission.

In embodiments of a Radio Base Station, RBS it comprises two or more antenna elements each antenna element having at least two antenna ports on the transmitting side, where the processing circuitry is further configured to assign an antenna port of different antenna element to each UE for the MIMO transmission.

The Radio Base Station, RBS, may furthermore store measured, received and/or calculated information of one or more of CSI information, Doppler frequency information and transmission channel estimation information for each of the first and at least second UE in the memory 62. This information may in some embodiments be used by the processing circuitry 61 for estimating one or more of the first CSI imperfection R1', second CSI imperfection R1" and spatial correlation R2.

The processing circuitry 61 may further be configured for estimating said channel state imperfection for each of said first and at least second UE by calculating $R1=J_0(2\pi f_d t_\Delta)$, where R1 denotes the CSI imperfection, $J_0(\bullet)$ is a zeroth order Bessel function of the first kind, $f_d$ is a Doppler frequency and $t_\Delta$ is a scheduling delay. Doppler frequency information is, as already mentioned above, easily obtained as being estimated by the radio base station for use in other applications such as scheduling, power allocation, transmission mode selection, to name some. The scheduling delay information is similarly also readily available in the radio base station as forming part of the usual RBS scheduling details.

The RBS may comprise processing circuitry configured to estimate the spatial correlation by calculating $R2=|u_1^H u_2|$; where weight vectors $u_1$ and $u_2$ denote first column vectors of $U_1$ and $U_2$, respectively, $U_1$ and $U_2$ represent unitary matrices obtained by decomposing $H_1$ and $H_2$ using singular value decomposition, SVD, and $H_1=U_1\Lambda_1 V_1^H$, $H_2=U_2\Lambda_2 V_2^H$.

Alternatively, in other embodiments, the RBS comprises processing circuitry configured for estimating the spatial correlation, R2 by calculating $$R_2 = \frac{\text{trace}\{|W_1^H * W_2|\}}{N},$$

where W1 denotes a first PMI feedback from the first UE, W2 denotes a second PMI feedback, from the second UE, H denotes a conjugate transpose operation and N denotes a number of supported layers.

Embodiments of a two-dimensional correlation indicator based UE-pairing procedure and/or algorithm have been proposed for a MIMO system, such as MU-MIMO system, so as to improve the MIMO performance by effectively reducing mutual interference. The use of two-dimensional correlation indicator according to embodiments of the present solution not only encapsulates the calculation of the spatial correlation between two users, but also takes into consideration the imperfection of CSI, mobility impact, as well as the UE feedback time mismatch. The herein proposed procedures and algorithms could be applied to both FDD and TDD scenarios. Although the examples in this disclosure are given for LTE and LTE-A systems, the aspects and embodiments of the present solution disclosed herein are applicable also for other DL/UL MIMO wireless networks even those not explicitly mentioned herein.

The embodiments of a two-dimensional UE pairing procedure of this disclosure provides improved MIMO performance by reducing interference between co-scheduled UEs. Embodiments of the present solution furthermore provides:

Low-complexity two-dimensional correlation calculation;
Applicability to both FDD and TDD;
Applicability to any CSI imperfection factors;
Applicability to both downlink MIMO and uplink MIMO, and
Applicability to any wireless system or standardization with MIMO configuration.

The herein described embodiments for pairing of a first UE and at least a second UE to share or use the same transmission resource in a MIMO transmission, such as a MU-MIMO transmission, may be implemented through one or more processors or processing circuitry, such as the processing circuitry 61 in the base station 60 depicted in FIG. 6, together with computer program code for performing the functions and/or method steps of the embodiments disclosed herein. The program code mentioned above may also be provided as a computer program product, for instance in the form of a data carrier carrying computer program code for performing the functions and/or method steps of the herein disclosed embodiments when being loaded into the radio base station 60. One such carrier may be in the form of a CD ROM disc. It is however feasible with other data carriers such as a memory stick. The computer program code may furthermore be provided as pure program code on a server and downloaded to the radio base station 60.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a radio base station (RBS) for selecting a first Use Equipment (UE) and at least one second UE from a plurality of UEs for sharing a transmission resource in a time-frequency dimension in a Multiple-Input, Multiple-Output (MIMO) transmission, the RBS comprising transceiver and antenna elements configured for MIMO transmission on one or more channels, the method comprising:
estimating a first imperfection of Channel State Information (CSI) made available for the first UE by:
calculating a first correlation (R1') between an estimation of a first transmission channel for the first UE and an estimation of a second transmission channel for the first UE; and
estimating the first imperfection of the CSI using the first correlation (R1');
estimating a second imperfection of CSI made available for the at least one second UE by:
calculating a second correlation (R1") between an estimation of a third transmission channel for the second UE and an estimation of a fourth transmission channel for the second UE; and
estimating the second imperfection of the CSI using the second correlation (R1");
estimating a spatial correlation between the first UE and the at least one second UE; and
selecting the first UE and the at least one second UE to use the same transmission resource in the time-frequency dimension if both the first correlation (R1') and the second correlation (R1") are above a first threshold and the spatial correlation is below a second threshold scheduling the first UE and the at least one second UE to share the transmission resource in the time and frequency dimensions.

2. The method of claim 1, further comprising:
assigning the first UE and the at least one second UE different antenna ports of the antenna elements of the RBS.

3. The method of claim 1:
wherein the first transmission channel for the first UE comprises a first true transmission channel and the second transmission channel for the first UE comprises a first estimated transmission channel; and
wherein the third transmission channel for the at least one second UE comprises a second true transmission channel and the fourth transmission channel for the at least one second UE comprises a second estimated transmission channel.

4. The method of claim 1, further comprising:
determining a first Doppler frequency and a first scheduling delay for the first UE;
determining a second Doppler frequency and a second scheduling delay for the at least one second UE; and
estimating R1' and R1" according to $R1=J_0(2\pi f_d t_A)$, where $J_0(\cdot)$ represents a zeroth order Bessel function of the first kind, $f_d$ represents a Doppler frequency for the corresponding UE, and $t_A$ represents a scheduling delay for the corresponding UE.

5. The method of claim 1, wherein estimating the first and second imperfections of the CSI comprises estimating the first and second imperfections of the CSI using a ratio of NACK messages to ACK messages received from the first UE and the at least one second UE during a respective scheduling delay established for each of the first UE and the at least one second UE.

6. The method of claim 5:
wherein the first and third transmission channels comprise a true transmission channel for respective ones of the first UE and the at least one second UE;
wherein the second and fourth transmission channels comprise an estimated transmission channel for respective ones of the first UE and the at least one second UE; and
wherein the ratio of received NACK messages to received ACK messages from each of the first UE and the at least one second UE is established and used to estimate the imperfection of CSI between the estimated transmission channel and the true transmission channel during the respective scheduling delay of each UE.

7. The method of claim 1, wherein estimating the spatial correlation between the first UE and the at least one second UE comprises estimating a correlation (R2) between a channel matrix ($H_1$) for a first transmission channel for the first UE and a channel matrix ($H_2$) for a second transmission channel for the at least one second UE.

8. The method of claim 7, wherein estimating R2 comprises calculating $R2=|u_1^H u_2|$, where weight vectors $u_1$ and $u_2$ represent first column vectors of $U_1$ and $U_2$ respectively, where $U_1$ and $U_2$ represent unitary matrices obtained by decomposing $H_1$ and $H_2$ using singular value decomposition (SVD), and where $H_i = U_i \Lambda_i V_i^H$ for i=1, 2.

9. The method of claim 1, wherein estimating the spatial correlation between the first UE and the at least one second UE comprises:
receiving a first Precoder Matrix Information (PMI) feedback ($W_1$) from the first UE;
receiving a second PMI feedback ($W_2$) from the at least one second UE;
wherein estimating the spatial correlation comprises estimating the spatial correlation according to $$R_2 = \frac{\text{trace}\{|W_1^H * W_2|\}}{N},$$

where H represents a conjugate transpose operation and N represents a number of supported layers.

10. The method of claim 1, wherein the channels comprise uplink or downlink channels in a Frequency Division Duplex system or a Time Division Duplex system.

11. The method of claim 1, wherein the CSI is made available as at least one of measurements and calculations performed in the RBS for the first UE and the at least one second UE.

12. The method of claim 1, wherein the CSI is made available as at least one of measurement and calculations received in a transmission from the first UE and the at least one second UE.

13. The method of claim 1, wherein the CSI comprises at least one of Channel Quality Indication (CQI) information, Precoder Matrix Information (PMI), and ACK/NACK information.

14. A Radio Base Station (RBS) configured for Multiple-Input, Multiple-Output (MIMO) transmission on one or more channels comprising:
a transceiver and two or more antenna elements;
processing circuitry configured to select a first User Equipment (UE) and at least one second UE from a plurality of UEs for sharing a transmission resource in a time-frequency dimension in the MIMO transmission, wherein the processing circuitry is further configured to:
estimate a first imperfection of Channel State Information (CSI) made available for the first UE by:
calculating a first correlation (R1') between an estimation of a first transmission channel for the first UE and an estimation of a second transmission channel for the first UE; and
estimating the first imperfection of the CSI using the first correlation (R1');
estimate a second imperfection of the CSI made available for the at least one second UE by:
calculating a second correlation (R1") between an estimation of a third transmission channel for the second UE and an estimation of a fourth transmission channel for the second UE; and
estimating the second imperfection of the CSI using the second correlation (R1");

estimate a spatial correlation between the first UE and the at least one second UE; and
select the first UE and the at least one second UE to share the transmission resource in the time-frequency dimension if both the first correlation (R1') and the second correlation (R1") are above a first threshold and the spatial correlation is below a second threshold.

15. The RBS of claim 14:
further comprising a scheduler circuit configured to schedule the first UE and the at least one second UE to share the transmission resource in the time and frequency dimension upon the selection;
wherein the processing circuitry is further configured to assign different antenna ports of the antenna element to the first UE and the at least one second UE for the MIMO transmission.

16. The RBS of claim 14:
wherein each antenna element comprises at least two antenna ports on a transmitting side; and
wherein the processing circuitry is further configured to assign a different antenna element to each UE for the MIMO transmission.

17. The RBS of claim 14:
further comprising a memory configured to store at least one of measured, received, and calculated information of CSI, Doppler frequency information, and transmission channel estimation information for each of the first UE and the at least one second UE;
wherein the processing circuitry estimates the first and second imperfections and the spatial correlation based on the stored information.

18. The RBS of claim 14 wherein the processing circuitry estimates the first correlation R1' and the second correlation R1" according to $R1 = J_0(2\pi f_d t_\Delta)$, where $J_0(\cdot)$ represents a zeroth order Bessel function of the first kind, $f_d$ represents a Doppler frequency for the corresponding UE, and $t_\Delta$ represents a scheduling delay for the corresponding UE.

19. The RBS of claim 14 wherein the processing circuitry estimates the spatial correlation R2 according to $R2 = |u_1^H u_2|$, where weight vectors $u_1$ and $u_2$ represent first column vectors of $U_1$ and $U_2$ respectively, where $U_1$ and $U_2$ represent unitary matrices obtained by decomposing $H_1$ and $H_2$ using singular value decomposition (SVD), and where $H_i = U_i \Lambda_i V_i^H$ for i=1, 2.

20. The RBS of claim 14, wherein the processing circuitry estimates the spatial correlation R2 according to $$R_2 = \frac{\text{trace}\{|W_1^H * W_2|\}}{N},$$

where $W_1$ represents a first Precoder Matrix Information (PMI) feedback from the first UE, $W_2$ represents a second PMI feedback from the at least one second UE, H represents a conjugate transpose operation, and N represents a number of supported layers.

21. The RBS of claim 14, wherein the channels comprise uplink or downlink channels in a Frequency Division Duplex system or a Time Division Duplex system.

22. The RBS of claim 14, wherein the CSI is made available as at least one of measurements and calculations performed in the RBS for the first UE and the at least one second UE.

23. The RBS of claim 14, wherein the CSI is made available as at least one of measurements and calculations received in a transmission from the first UE and the at least one second UE.

24. The RBS of claim 14, wherein the CSI comprises at least one of Channel Quality Indication (CQI) information, Precoder Matrix Information (PMI), and ACK/NACK information.

* * * * *